(12) United States Patent
Eronen et al.

(10) Patent No.: US 8,838,147 B2
(45) Date of Patent: Sep. 16, 2014

(54) METHOD AND APPARATUS FOR DETERMINING ENVIRONMENTAL CONTEXT UTILIZING FEATURES OBTAINED BY MULTIPLE RADIO RECEIVERS

(75) Inventors: Antti Eronen, Tampere (FI); Jussi Leppanen, Tampere (FI); Jussi Taneli Collin, Viiala (FI); Jussi Parviainen, Pirkkala (FI); Jayaprasad Bojja, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/222,708

(22) Filed: Aug. 31, 2011

(65) Prior Publication Data

US 2013/0053069 A1 Feb. 28, 2013

(51) Int. Cl.
- *H04B 17/00* (2006.01)
- *H04W 4/02* (2009.01)
- *H04W 88/02* (2009.01)

(52) U.S. Cl.
USPC ............ 455/456.3; 137/550.1; 137/566

(58) Field of Classification Search
USPC .......... 455/456.3, 446, 423, 137, 550.1, 566; 708/270; 382/190, 115; 706/14
See application file for complete search history.

(56) References Cited

U.S. PATENT DOCUMENTS

| | | | | |
|---|---|---|---|---|
| 6,711,404 | B1 * | 3/2004 | Arpee et al. | 455/423 |
| 7,769,396 | B2 | 8/2010 | Alizadeh-Shabdiz et al. | |
| 7,991,199 | B2 * | 8/2011 | Das | 382/115 |
| 2007/0239813 | A1 * | 10/2007 | Pinder et al. | 708/270 |
| 2008/0261604 | A1 * | 10/2008 | Ritter | 455/446 |
| 2008/0304750 | A1 * | 12/2008 | Kamei | 382/190 |
| 2009/0319605 | A1 | 12/2009 | Wirola et al. | |
| 2010/0088259 | A1 * | 4/2010 | Valpola et al. | 706/14 |
| 2011/0125866 | A1 | 5/2011 | Williams | |
| 2011/0165893 | A1 | 7/2011 | Hyung et al. | |
| 2011/0246148 | A1 * | 10/2011 | Gupta et al. | 703/2 |
| 2012/0059780 | A1 * | 3/2012 | Kononen et al. | 706/14 |

FOREIGN PATENT DOCUMENTS

| | | |
|---|---|---|
| EP | 1 901 163 A1 | 3/2008 |
| WO | WO 01/43364 A1 | 6/2001 |

OTHER PUBLICATIONS

Hansen et al., "Seamless Indoor/Outdoor Positioning Handover for Location-Based Services in Streamspin", 2009 IEEE, 2009 Tenth International Conference on Mobile Data Management: Systesm, Stervices and Middleware, p. 267-272.*

Riva et al., "A Next Generation Operator Environment to Turn Context-aware Services into a Commercial Reality", 2008 IEEE, The Ninth International Conference on Mobile Data Management, p. 90-97.*

International Search Report and Written Opinion for Application No. PCT/FI2012/050780 dated Feb. 18, 2013.

(Continued)

*Primary Examiner* — Meless Zewdu
*Assistant Examiner* — Jean Chang
(74) *Attorney, Agent, or Firm* — Alston & Bird LLP (57) ABSTRACT

A method, apparatus and computer program product are provided to facilitate the determination of the environmental context of a mobile terminal. In this regard, the method, apparatus and computer program product may utilize the features obtained by a plurality of different types of radio receivers in order to more precisely determine the environmental context of the mobile terminal. The performance of the mobile terminal including applications executed by the mobile terminal may correspondingly be more accurately tailored to the current environmental context of the mobile terminal.

23 Claims, 5 Drawing Sheets

(56) References Cited

OTHER PUBLICATIONS

Parviainen, J., *SeCoCO: Literature Survey*, Tampere University of Technology, Jan. 21, 2011, 7 pages.

Eronen et al., *Audio-Based Context Recognition*, IEEE Trans. on Audio, Speech, and Language Proc, vol. 14, No. 1, (2006) 321-329.

Yang, J., *Toward Physical Activity Diary: Motion Recognition Using Simple Acceleration Features With Mobile Phones*, The $1^{st}$ International Workshop on Interactive Multimedia for Consumer Electronics (IMCE) at ACM Multimedia 2009.

Wackernagel, H., *Multivariate Geostatistics, An Introduction With Applications*, $3^{rd}$ Edition, Springer, (1995) (entire book).

* cited by examiner

METHOD AND APPARATUS FOR DETERMINING ENVIRONMENTAL CONTEXT UTILIZING FEATURES OBTAINED BY MULTIPLE RADIO RECEIVERS

TECHNOLOGICAL FIELD

Example embodiments of the present invention relate generally to context determination and, more particularly, to the determination of environmental context utilizing features obtained by multiple radio receivers.

BACKGROUND

Mobile terminals may be utilized in a wide variety of environmental contexts. For example, mobile terminals may be utilized either indoors or outdoors, at the home or office, etc. In this regard, the environmental context of a mobile terminal is distinguished from the activity context of the user of the mobile terminal with the environmental context defining the environment or surroundings within which the mobile terminal operates, while the activity context is intended to identify an activity, such as running, walking, bicycling, etc. in which the user of the mobile terminal is currently engaged.

Contextual information, such as information regarding the environmental context of the mobile terminal, may be useful in order to tailor the performance of the mobile terminal to the current context. In this regard, the performance of many applications that are executed by the mobile terminal may be tailored based upon the environmental context of the mobile terminal. In this regard, a contacts or phone book application may present different responses to the user or may differently prioritize the responses based upon the environmental context of the mobile terminal. As another example, a media recommendation application may provide different recommendations to the user based upon the environmental context of the mobile terminal.

Various techniques have been developed in an effort to determine the environmental context of a mobile terminal. However, it would be desirable to provide improved techniques for determining the environmental context of a mobile terminal such that the performance of the mobile terminal including, for example, the performance of various applications executed by the mobile terminal may be even more precisely tailored based upon the environmental context of the mobile terminal.

BRIEF SUMMARY

A method, apparatus and computer program product are therefore provided according to an example embodiment of the present invention in order to provide improvements in the determination of the environmental context of a mobile terminal. In this regard, the method, apparatus and computer program product of one example embodiment may utilize the features obtained by a plurality of different types of radio receivers in order to more precisely determine the environmental context of the mobile terminal. As such, the performance of the mobile terminal including applications executed by the mobile terminal may be more accurately tailored to the current environmental context of the mobile terminal.

In one example embodiment, a method is provided that includes receiving a first feature from a first radio receiver and a second feature from a second radio receiver. The second radio receiver may be a different type than the first radio receiver. The method of this embodiment also determines, with a processor, an environmental context based upon a combination of the first and second features.

The method of one embodiment may also concatenate the first feature and the second feature into a feature vector. As such, the determination of the environmental context may be based upon the feature vector, such as by applying a classifier to the feature vector. The method may also normalize and/or transform the feature vector. For example, the feature vector may be transformed in accordance with a linear transform.

In another example embodiment, an apparatus is provided that includes at least one processor and at least one memory storing computer program code with the at least one memory and stored computer program code being configured, with the at least one processor, to cause the apparatus to at least receive a first feature from a first radio receiver and a second feature from a second radio receiver. The second radio receiver may be a different type than the first radio receiver. The apparatus of this embodiment is also caused to determine an environmental context based upon a combination of the first and second features.

The at least one memory and stored computer program code of one embodiment are further configured, with the at least one processor, to cause the apparatus to concatenate the first feature and the second feature into a feature vector such that the determination of the environmental context may be based upon the feature vector, such as by applying a classifier to the feature vector. The at least one memory and stored computer program code may be further configured, with the at least one processor, to cause the apparatus to normalize and/or transform the feature vector. For example, the feature vector may be transformed in accordance with a linear transform. The apparatus may comprise or be embodied in a mobile terminal. In this regard, the mobile terminal may include user interface circuitry and user interface software stored on one or more of the at least one memory with the user interface circuitry and user interface software being configured to facilitate user control of at least some functions of the mobile terminal through use of a display and to cause at least a portion of a user interface of the mobile terminal to be displayed on the display to facilitate user control of at least some functions of the mobile terminal.

In a further embodiment, a computer program product is provided that includes at least one non-transitory computer-readable storage medium having computer-readable program instructions stored therein with the computer-readable program instructions including program instructions configured to receive a first feature from a first radio receiver and a second feature from a second radio receiver. The second radio receiver may be of a different type than the first radio receiver. The computer-readable program instructions may include program instructions configured to determine an environmental context based upon a combination of the first and second features.

The computer-readable program instructions of one embodiment may also include program instructions configured to concatenate the first feature and the second feature into a feature vector such that the environmental context may be determined based upon the feature vector by, for example, applying a classifier to the feature vector. The computer-readable program instructions may also include program instructions configured to normalize the feature vector and/or transform the feature vector, such as in accordance with a linear transform.

In yet another example embodiment, an apparatus is provided that includes means for receiving a first feature from a first radio receiver and means for receiving a second feature from a second radio receiver. The second radio receiver may be a different type than the first radio receiver. The apparatus of this embodiment also includes means for determining an environmental context based upon a combination of the first and second features.

The apparatus of one embodiment may also include means for concatenating the first feature and the second feature into a feature vector. As such, the determination of the environmental context may be based upon the feature vector, such as by applying a classifier to the feature vector. The apparatus may also include means for normalizing the feature vector and/or means for transforming the feature vector. For example, the feature vector may be transformed in accordance with a linear transform.

In one embodiment, a method is provided that includes receiving first and second features that have been extracted by a mobile terminal from first and second radio receivers, respectively, and causing the first and second features to be stored. The method of this embodiment also performs, with a processor, a geostatistical analysis of the first and second features and enables at least one application to utilize a result of the geostatistical analysis of the first and second features that have been extracted by the mobile terminal from the first and second radio receivers, respectively.

In another example embodiment, an apparatus is provided that includes at least one processor and at least one memory storing computer program code with the at least one memory and stored computer program code being configured, with the at least one processor, to cause the apparatus to at least receive first and second features that have been extracted by a mobile terminal from first and second radio receivers, respectively, and to cause the first and second features to be stored. The apparatus of this embodiment is also caused to perform a geostatistical analysis of the first and second features and to enable at least one application to utilize a result of the geostatistical analysis of the first and second features that have been extracted by the mobile terminal from the first and second radio receivers, respectively.

In a further embodiment, a computer program product is provided that includes at least one non-transitory computer-readable storage medium having computer-readable program instructions stored therein with the computer-readable program instructions including program instructions configured to receive first and second features that have been extracted by a mobile terminal from first and second radio receivers, respectively, and to cause the first and second features to be stored. The computer-readable program instructions of this embodiment also include program instructions configured to perform a geostatistical analysis of the first and second features and to enable at least one application to utilize a result of the geostatistical analysis of the first and second features that have been extracted by the mobile terminal from the first and second radio receivers, respectively.

In yet another embodiment, an apparatus is provided that includes means for receiving first and second features that have been extracted by a mobile terminal from first and second radio receivers, respectively, and means for causing the first and second features to be stored. The apparatus of this embodiment also includes means for performing a geostatistical analysis of the first and second features and means for enabling at least one application to utilize a result of the geostatistical analysis of the first and second features that have been extracted by the mobile terminal from the first and second radio receivers, respectively.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Having thus described example embodiments of the present invention in general terms, reference will hereinafter be made to the accompanying drawings, which are not necessarily drawn to scale, and wherein:

DETAILED DESCRIPTION

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical-medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media.

However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
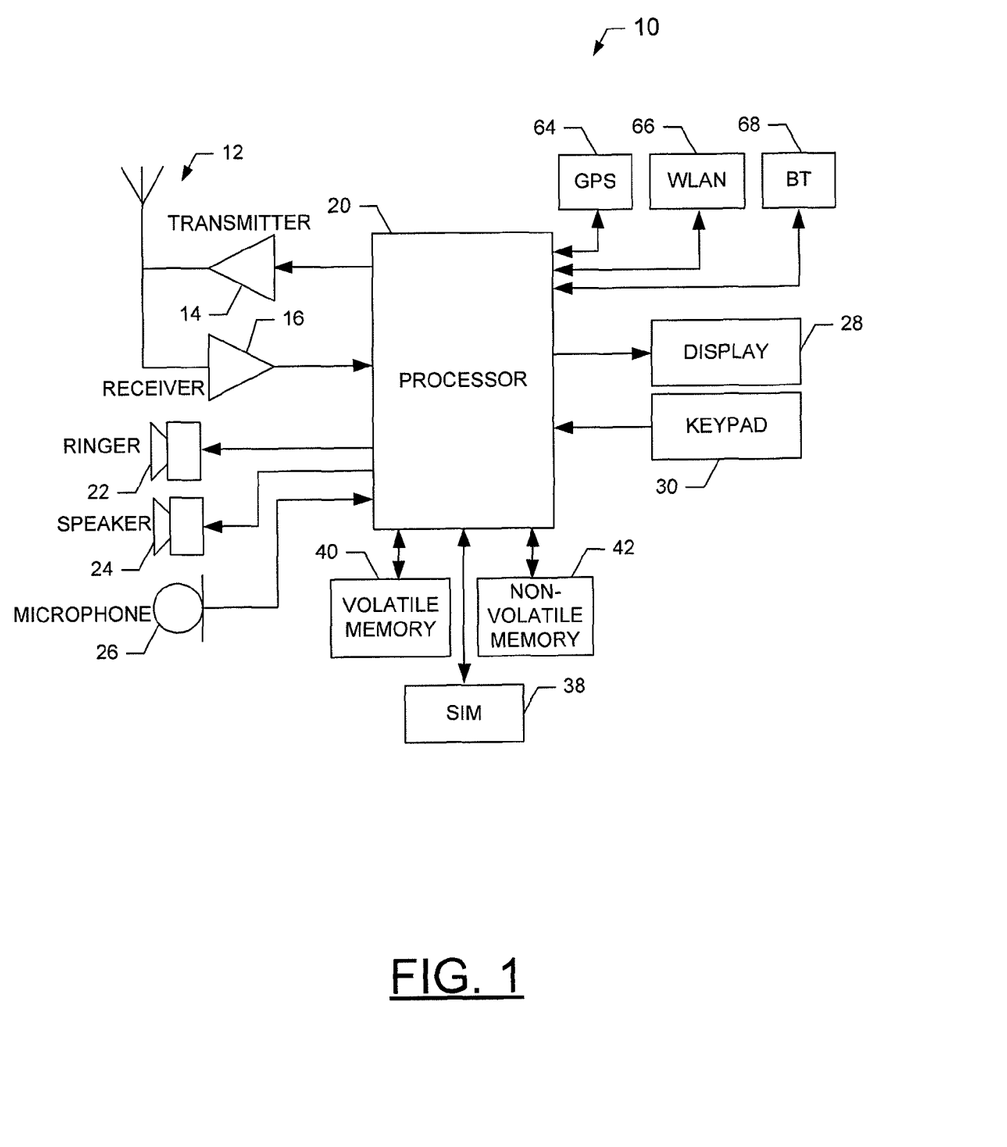
FIG. 1 is a block diagram of a mobile terminal in accordance with one example embodiment of the present invention.

Mobile terminals may be utilized in a wide variety of different contexts, such as indoors and outdoors, at work, home or a natural setting or the like. In accordance with one example embodiment, the performance of the mobile terminal may be tailored based upon its environmental context. In this regard, FIG. 1 illustrates a block diagram of a mobile terminal 10 that may be configured in accordance with an example embodiment of the present invention, but the mobile terminal may be configured in other manners, such as with more, fewer or different components in other embodiments. Indeed, while one embodiment of the mobile terminal will be illustrated and hereinafter described for purposes of example, other types of mobile terminals, such as mobile telephones, mobile computers, personal digital assistants (PDAs), pagers, laptop computers, desktop computers, gaming devices, televisions, and other types of electronic systems, may employ various embodiments of the invention.

As shown, however, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor 20 may additionally comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal 10 may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal 10.

As shown in FIG. 1, the mobile terminal 10 may also include one or more radio receivers. As described above, the mobile terminal 10 may include a cellular radio receiver which, in one embodiment, may be comprised by the antenna 12, transmitter 14 and/or receiver 16 for communicating with one or more cellular radio networks, such as a GSM, 3G and/or 4G network. The mobile terminal 10 may also include a radio receiver 64 for communicating with a Global Navigation Satellite System (GNSS) and/or a Global Positioning System (GPS) including, for example, an Assisted Global Positioning System (A-GPS), hereinafter generically referenced as a GPS radio receiver. The GPS radio receiver 64 may receive signals that define the location of the mobile terminal 10, such as latitude and longitude coordinates of the mobile terminal 10.

In the illustrated embodiment, the mobile terminal 10 may include a radio receiver, such as a WLAN radio receiver 66, that includes a short-range transceiver that is capable of transmitting data to and/or receiving data from electronic devices within a proximity of the mobile terminal. The WLAN radio receiver 66 may be capable of transmitting and/or receiving data from electronic devices according to various wireless networking techniques, including WLAN techniques such as IEEE 802.11 techniques, IEEE 802.15 techniques, IEEE 802.16 techniques, Wi-Fi techniques and/or the like. Still further, the mobile terminal 10 may include a Bluetooth™ (BT) radio receiver 68 including, for example, a short-range BT transceiver operating using Bluetooth™ brand wireless technology developed by the Bluetooth™ Special Interest Group. The Bluetooth™ transceiver may be capable of operating according to ultra-low power Bluetooth™ technology (for example, Wibree™) radio standards. While the mobile terminal 10 of FIG. 1 includes a plurality of different types of radio receivers, mobile terminals of other embodiments may include additional or different radio receivers.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40, non-volatile memory 42 may also include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 2:
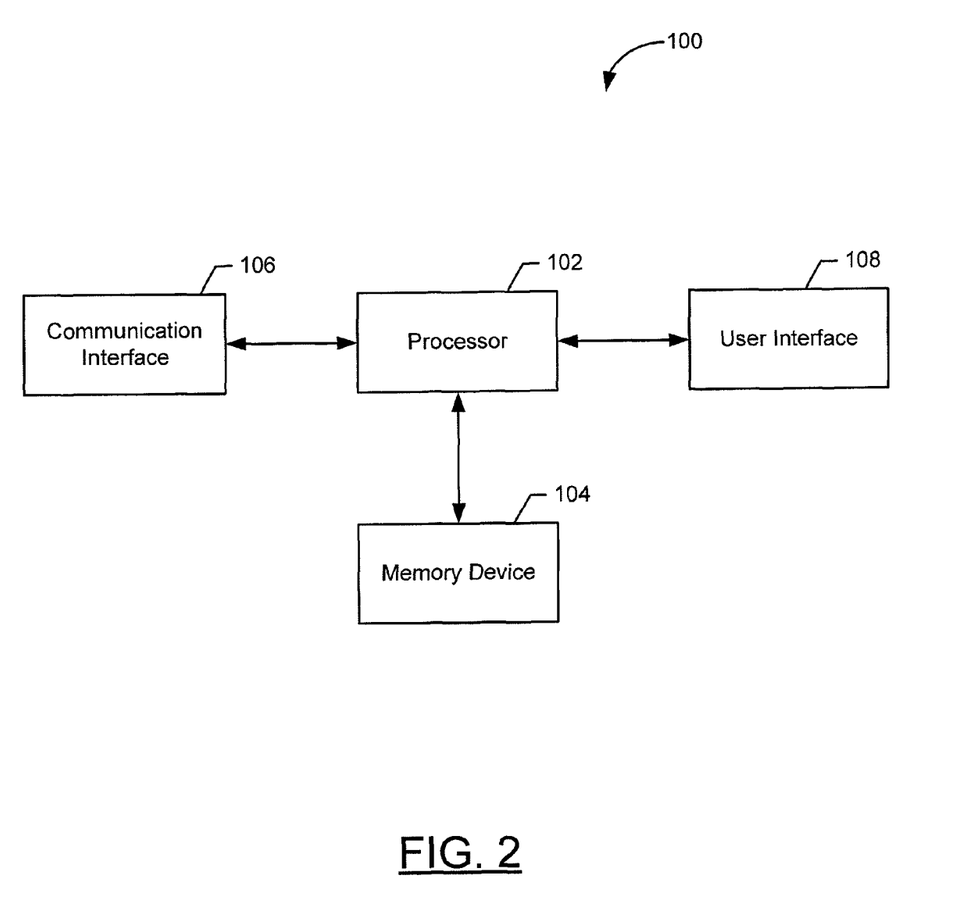
FIG. 2 is a block diagram of an apparatus in accordance with one embodiment of the present invention.

An example embodiment of the invention will now be described with reference to FIG. 2, in which certain elements of an apparatus 100 for determining an environmental context of a mobile terminal are depicted. The apparatus 100 of FIG. 2 may be employed, for example, in conjunction with the mobile terminal 10 of FIG. 1. However, it should be noted that the apparatus 100 of FIG. 2, may also be employed in connection with a variety of other devices and therefore, embodiments of the present invention should not be limited to application on devices such as the mobile terminal 10 of FIG. 1. Indeed, the apparatus 100 of FIG. 2 may be employed in conjunction with a network entity, such as a server, with which the mobile terminal 10 communicates as described below in conjunction with FIG. 5. It should also be noted that while FIG. 2 illustrates one example of a configuration of an apparatus 100 for determining an environmental context of a mobile terminal 10, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 100 for determining the environmental context of a mobile terminal 10 is provided and may include or otherwise be in communication with a processor 102, a memory device 104, a communication interface 106 and a user interface 108. In some embodiments, the processor 102 (and/or co-processors or any other processing circuitry assisting or otherwise associated with the processor 102) may be in communication with the memory device 104 via a bus for passing information among components of the apparatus 100. The memory device 104 may include, for example, one or more volatile and/or non-volatile memories. In other words, for example, the memory device 104 may be an electronic storage device (e.g., a computer readable storage medium) comprising gates configured to store data (e.g., bits) that may be retrievable by a machine (e.g., a computing device like the processor 102). The memory device 104 may be configured to store information, data, applications, instructions or the like for enabling the apparatus to carry out various functions in accordance with an example embodiment of the present invention. For example, the memory device 104 could be configured to buffer input data for processing by the processor 102. Additionally or alternatively, the memory device 104 could be configured to store instructions for execution by the processor 102.

The apparatus 100 may, in some embodiments, be a mobile terminal (e.g., mobile terminal 10) configured to employ an example embodiment of the present invention. However, in some embodiments, the apparatus 100 may be embodied as a chip or chip set. In other words, the apparatus 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 100 may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor 102 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 102 may include one or more processing cores configured to perform independently. A multi-core processor may enable multiprocessing within a single physical package. Additionally or alternatively, the processor 102 may include one or more processors configured in tandem via the bus to enable independent execution of instructions, pipelining and/or multithreading.

In an example embodiment, the processor 102 may be configured to execute instructions stored in the memory device 104 or otherwise accessible to the processor 102. Alternatively or additionally, the processor 102 may be configured to execute hard coded functionality. As such, whether configured by hardware or software methods, or by a combination thereof, the processor 102 may represent an entity (e.g., physically embodied in circuitry) capable of performing operations according to an embodiment of the present invention while configured accordingly. Thus, for example, when the processor 102 is embodied as an ASIC, FPGA or the like, the processor 102 may be specifically configured hardware for conducting the operations described herein. Alternatively, as another example, when the processor 102 is embodied as an executor of software instructions, the instructions may specifically configure the processor 102 to perform the algorithms and/or operations described herein when the instructions are executed. However, in some cases, the processor 102 may be a processor of a specific device (e.g., a mobile terminal or other computing device), such as processor 20 of mobile terminal 10 of FIG. 1, adapted for employing an embodiment of the present invention by further configuration of the processor 102 by instructions for performing the algorithms and/or operations described herein. The processor 102 may include, among other things, a clock, an arithmetic logic unit (ALU) and logic gates configured to support operation of the processor 102.

Meanwhile, the communication interface 106 may be any means such as a device or circuitry embodied in either hardware or a combination of hardware and software that is configured to receive and/or transmit data from/to a network and/or any other device or module in communication with the apparatus 100. In this regard, the communication interface 106 may include, for example, an antenna (or multiple antennas) and supporting hardware and/or software for enabling communications with a wireless communication network. Additionally or alternatively, the communication interface 106 may include the circuitry for interacting with the antenna(s) to cause transmission of signals via the antenna(s) or to handle receipt of signals received via the antenna(s). In some environments, the communication interface 106 may alternatively or also support wired communication. As such, for example, the communication interface 106 may include a communication modem and/or other hardware/software for supporting communication via cable, digital subscriber line (DSL), universal serial bus (USB) or other mechanisms. In an embodiment in which the apparatus 100 comprises or is embodied by the mobile terminal 10 of FIG. 1, the communication interface 106 may include the cellular radio receiver comprising the antenna 12, the transmitter 14 and the receiver 16, the GPS radio receiver 64, the WLAN radio receiver 66 and/or the BT radio receiver 68.

The user interface 108 may be in communication with the processor 102 to receive an indication of a user input at the user interface 108 and/or to cause provision of an audible, visual, mechanical or other output to the user. As such, the user interface 108 may include, for example, a keyboard, a mouse, a joystick, a display, a touch screen(s), touch areas, soft keys, a microphone, a speaker, or other input/output mechanisms. Alternatively or additionally, the processor 102 may comprise user interface circuitry configured to control at least some functions of one or more elements of the user interface, such as, for example, a speaker, ringer, microphone, display, and/or the like. The processor 102 and/or user interface circuitry comprising the processor 102 may be configured to control one or more functions of one or more elements of the user interface through computer program instructions (e.g., software and/or firmware) stored on a memory accessible to the processor 102 (e.g., memory device 104, and/or the like).

In accordance with the example embodiments of the present invention, various features are extracted from the signals received by a plurality of different types of radio receivers of a mobile terminal 10. Based upon the combination of features, the environmental context of the mobile terminal 10 may be determined. Once the environmental context is determined, the performance of the mobile terminal 10 may be at least partially tailored in accordance with the environmental context. In this regard, one or more applications executed by the mobile terminal 10 may take into account the environmental context and may perform or otherwise provide results that are at least partially based upon the environmental context. For example, a phone book or contacts application may present results or at least prioritize results based upon the environmental context of the mobile terminal 10. Additionally, an application that is intended to recommend media may make those recommendations at least partially upon the context of the mobile terminal 10. Further, the display 28 of the mobile terminal 10 may be driven in such a manner that is at least partially based upon the environmental context, such as by being driven so as to have greater brightness in an instance in which the mobile terminal 10 is outside and less brightness in an instance in which the mobile terminal 10 is indoors, thereby conserving battery consumption. While several examples are provided above, a mobile terminal 10 may adapt its behavior in a wide variety of different manners based at least in part upon the environmental context with the foregoing examples merely intended to provide an illustration, but not a limitation, of the manners in which the performance of a mobile terminal 10 may tailored to its environmental context.

Figure 3:
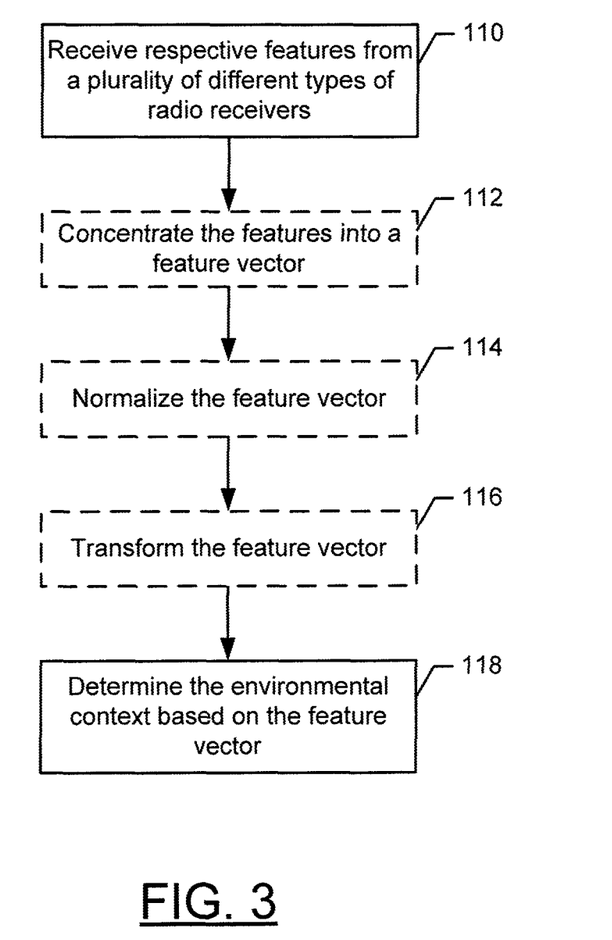
FIG. 3 is a flowchart illustrating the operations performed in accordance with one example embodiment of the present invention.
Figure 4:
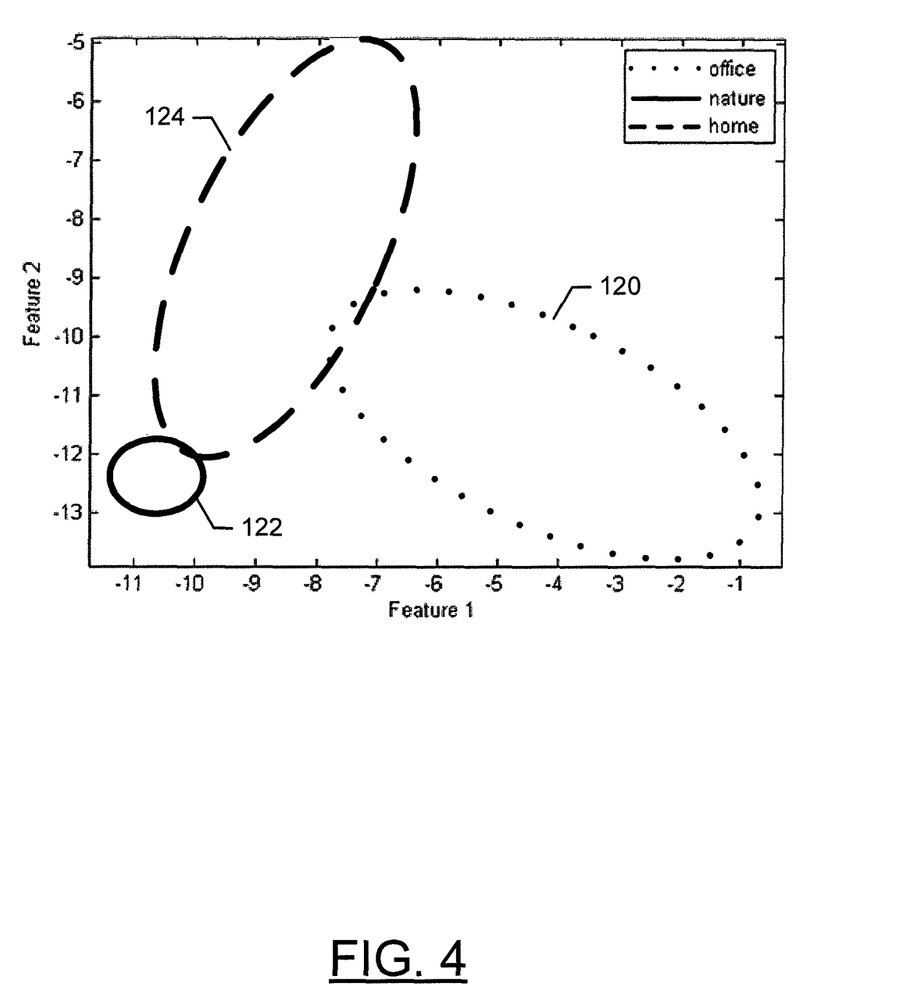
FIG. 4 is a graphical representation of first and second features in three different environmental contexts.

Referring now to FIG. 3, the operations performed by an apparatus 100 in accordance with one example embodiment of the present invention are shown. In this regard, the apparatus 100 of one example embodiment may include means, such as the processor 102, the communication interface 106 or the like, for receiving respective features from a plurality of different types of radio receivers. See operation 110. In this regard, at least a first feature may be received from a first radio receiver and at least a second feature may be received from a second radio receiver. However, additional features may be received from the first and second radio receivers and/or additional features may be received from other radio receivers. The radio receivers that provide the respective features are different types of radio receivers such that the features are generally not duplicative of one another, but are distinct and provide different types of information. Indeed, as graphically shown in FIG. 4, different combinations of first and second features may identify different environmental contexts. With reference to FIG. 4, for example, the combination of Feature 1 having a value of −4 and Feature 2 having a value of −12 indicates that the mobile terminal 10 is at the office. Alternatively, the combination of Feature 1 having a value of −9 and Feature 2 having a value of −10 indicates that the mobile terminal 10 is at home, while a combination of Feature 1 having a value of −10.5 and Feature 2 having a value of −12.5 indicates that the mobile terminal 10 is in a natural setting.

The apparatus 100 may include a communication interface 106 that includes a plurality of different types of radio receivers. For example, the communication interface 106 may include a cellular radio receiver. The cellular radio receiver may determine a number of different features including a number of unique cell identities (IDs), the number of unique location area codes (LACs), the number of cell ID changes per minute, the number of location area code changes per minute and/or the standard deviation of signal strength. The communication interface 106 of one embodiment may also include a GPS radio receiver 64. A GPS radio receiver 64 may determine a number of features including the maximum carrier to noise ratio, such as the maximum carrier to noise ratio value of the one minute GPS data. In this regard, the carrier to noise ratio is an estimate of received power and may be provided by the GPS radio receiver 64 for each tracked satellite. A relatively low carrier to noise ratio may indicate that there are obstacles, such as building walls, in the satellite-to-receiver path, thereby indicating that the mobile terminal 10 is indoors. Conversely, a relatively high carrier to noise ratio may indicate the absence of obstacles in the satellite-to-receiver path, thereby suggesting that the mobile terminal 10 is outdoors.

A GPS radio receiver 64 may also provide a minimum elevation angle value from the satellites that are utilized to obtain the GPS position fixes. In this regard, the elevation angle is the angle between the local horizontal plane and the user-satellite vector. In urban canyons, satellites with small elevation angles are rarely tracked such that larger minimum elevation angle values are indicative of an urban setting while smaller minimum elevation angle values are indicative of a rural setting. A GPS radio receiver 64 may also determine the maximum speed value, such as the maximum speed value from the one minute GPS data. In one embodiment, a Doppler-based speed estimate may be determined by the GPS radio receiver 64. However, a maximum speed value may also be determined from two consecutive position fixes in which the distance between the position fixes divided by the time between the position fixes defines the speed value. Relatively large maximum speed values may indicate that the mobile terminal 10 is in a moving vehicle, while extremely low speed values may indicate that the mobile terminal 10 is stationary or at least not moving at anything other than a walking pace. A GPS radio receiver 64 may also determine the best horizontal accuracy value of the GPS position fixes. The best horizontal accuracy value is generally obtained in rural areas with clear sky-view. A GPS radio receiver 64 may also determine the time to first fix (TTFF), that is, the time that passes from the time of power-up to the instant in which the first location measurement is obtained.

The communication interface 106 may also include a WLAN radio receiver 68. A WLAN radio receiver 68 may also determine a number of features, such as the number of unique media access control (MAC) addresses, the number of unique station names, the mean signal strength, such as within a predefined scale, e.g., a scale of 1-5, the standard deviation of signal strength such as in accordance with a decibel (dB) scale and/or another predefined scale, e.g., a scale of 1-5, the maximum signal strength, such as in dB and/or in accordance with a predefined scale, such as a scale of 1-5. The communication interface 106 may also include other types of radio receivers. As shown in FIG. 1, the communication interface 106 may include a BT radio receiver 68. A BT radio receiver 68 may also determine a number of features of the radio signals received thereby including, for example, the number of BT devices with which the BT radio receiver 68 is in communication.

In accordance with one embodiment of the present invention, the radio receivers may be activated so as to communicate with and receive signals of the respective type. In one embodiment, the mobile terminal 10, such as the processor 20, may request the various radio receivers to provide the respective features, such as at predefined time intervals, e.g., every ten minutes. As such, the features of the signals received by the various radio receivers may be extracted from the signals received by the radio receivers and provided to the processor 20. Although the features may be the signals themselves, the features may, for example, be statistics based upon the signals received by the respective radio receivers, such as the maximum, minimum, standard deviation, etc. of the signals received by the respective radio receivers. Additionally or alternatively, the features may be even more robust and may be based upon the median or median absolute deviation of the signals received by the respective radio receivers, thereby increasing the reliability of the environmental context determination.

Although the features may be processed in various manners to facilitate the determination of the environmental context, the apparatus 100 of one embodiment may include means, such as the processor 102 or the like, for concatenating the features to define a feature vector, as shown in operation 112. The apparatus 100 may also include means, such as the processor 102 or the like, for normalizing the feature vector, such as by subtracting a mean vector and dividing the result with a standard deviation vector. See operation 114. In one embodiment, for example, the processor 102 may normalize the feature vector by subtracting a global mean vector and dividing the result by a global co-variance matrix or variance vector, as described below. The apparatus 100 of one embodiment may include means, such as the processor 102 or the like, for transforming the feature space into another space of more desirable properties, such as uncorrelatedness or maximum separability of classes. See operation 116. In this regard, the feature space, such as the normalized feature vector, may be transformed in accordance with a linear transform, e.g., in accordance with a linear discriminant analysis. However, the normalized feature vector may be transformed in other manners including in accordance with principal component analysis, independent component analysis or non-negative matrix factorization. In one embodiment, the apparatus 100, such as the processor 102, may normalize the feature vector by subjecting the feature vector to a plurality of different transforms performed in a sequence.

As shown in operation 118, the apparatus 100 may also include means, such as the processor 102 or the like, for analyzing the feature vector, such as the normalized, transformed feature vector, so as to determine the environmental context of the mobile terminal 10. The processor 102 may determine the environmental context based upon the feature vector in various manners including the application of a classifier to the feature vector in which the classifier identifies the class associated with the feature vector with the class, in turn, being associated with a respective environmental context. The processor 102 may utilize a variety of different classifiers including a Bayesian classifier, a neural network, a nearest neighbor classifier or a support vector machine (SVM). In another embodiment, the processor 102 may compare the feature vector to a plurality of context models that are indicative of respective environmental contexts. By determining the context model that is most representative of the feature vector, such as the normalized, transformed feature vector, the environmental context may be determined to be the same as or similar to that associated with the most representative context model.

In this embodiment, a plurality of context models may be collected by mobile terminals 10 that are in a number of different environmental contexts, such as indoors, outdoors, in an office, at home, in natural settings or the like. For each context model, the user of the mobile terminal 10 may simply select the environmental context and the mobile terminal 10 may then determine the feature vector associated therewith, such as by collecting signals from the plurality of radio receivers, extracting features therefrom and then defining the corresponding feature vector. As such, a plurality of context models can be collected in an expeditious manner without significant imposition upon the users of the mobile terminals. In an instance in which a plurality of context models are collected for the same or very similar environmental contexts, the plurality of context models may define a class of context models and the mean or variance of the class may be determined and then utilized as the context model representative of the respective environmental context. As such, a context model associated with a respective environmental context may include a mean vector and a co-variance matrix. During the training phase, a global mean vector and a global co-variance matrix or variance vector may be estimated based upon the mean vectors and co-variance matrices of all of the context models. These global mean vectors and global co-variance matrices or variance vectors may be stored, such as in the memory device 104, and utilized in order to normalize the feature vectors, such as in accordance with operation 114 described above.

In order to determine the environmental context from the feature vector, such as a normalized transformed feature vector, the apparatus 100, such as the processor 102, may compare the feature vector to the various context models and the context model that is most representative, such as most similar to the feature vector, is considered a match. In this regard, the environmental context associated with the context model that is most similar to the feature vector may be determined to be the environmental context in which the mobile terminal 10 currently exists. While the feature vector may be compared with the context models in various manners, the apparatus 100, such as the processor 102, of one embodiment may utilize pattern recognition. In this regard, pattern recognition may be considered as discrimination between p multivariate normal populations. In this context, for example, p may represent the number of different context models. In this regard, a training data set with known states may be collected to obtain:

$$z_j \sim N(\mu_j, \Sigma_j), \tag{1}$$

In equation (1), $z_j$ represents the distribution of observed q-dimensional vector z given that the observation comes from population j. The mean vector $\mu_j$ (q×1) and the covariance matrix $\Sigma_j$ (q×q) are assumed to be perfectly known such that the training data set is very representative. In an instance in which equation (1) is true and $\Sigma_j$ is positive definite, the density function f of $z_j$ is:

$$f_{z_j}(z; \mu_j, \Sigma_j) = \frac{1}{\sqrt{|2\pi\Sigma_j|}} \exp\left[-\frac{(z-\mu_j)^T \Sigma_j^{-1}(z-\mu_j)}{2}\right]. \tag{2}$$

In accordance with one embodiment of the present invention, the apparatus 100, such as the processor 102, may classify a feature vector $z_x$ as being indicative of a respective environmental context may maximize equation (2) for a feature vector $z=z_x$ over all the classes, e.g., context models, j=1 ... p. The classes in accordance with an example embodiment of the present invention may have some overlap, but are such that the apparatus may identify the correct environmental context with at least a predefined level of accuracy, such as 90% in one embodiment. For example, the mean of the observed GPS satellite carrier to noise ratio is significantly lower in indoor environments than in outdoor environments due to the limited transmission power of satellites. As such, by comparing the feature vector, such as the normalized, transformed feature vector, to the various context models, such as by maximizing equation (2) over the various context models, the processor 102 may determine the context model to which the feature vector best matches or which most likely produced the feature vector such that the environmental context associated with the respective context model may be determined to be the current environmental context.

In addition to utilizing features extracted from the signals obtained from a plurality of radio receivers, the apparatus 100, such as the processor 102 or the like, may also utilize features from other device sensors of the mobile terminal 10, such as spectral values or spectral features derived from vector analysis of audio data or accelerometer data. The features obtained from the radio receivers described above may be concatenated with the features obtained from the other device sensors, such as the features obtained from an audio-based context classifier and/or an accelerometer-based context classifier. Based upon the resulting feature vector, the environmental context of the mobile terminal 10 may be determined, such as by the processor 20, in an even more robust manner.

Based upon the environmental context of the mobile terminal 10 as determined in the manner described above, the mobile terminal 10 may operate or perform in a manner that changes and is dependent upon the environmental context, such as by changing its performance depending upon whether the mobile terminal 10 is determined to be inside or outdoors. In one embodiment, the apparatus 100 may include means, such as the processor 102, the communication interface 106 or the like, for causing the features extracted from the radio receivers and other device sensors as well as the resulting environmental context of the mobile terminal 10 to be provided to a network entity, such as a server.

The network entity, such as the server, may be embodied by an apparatus 100 of the type shown in FIG. 2 having a processor 102, a memory device 104 and a communication interface 106, albeit generally without the user interface 108. As shown in operation 130 of FIG. 5, the apparatus 100 embodied by the network entity, such as the server, may include means, such as the processor 102, the communication interface 106 or the like, for receiving the features provided by the mobile terminal 10, such as the extracted features, which may be provided in the form of a feature vector in one embodiment, and the environmental context as determined from the extracted features. The server may, in turn, include means, such as the processor 102, the memory device 104 or the like, for causing storage of the features and/or the feature vector, the resulting environmental context and the location of the mobile terminal 10, such as provided by the GPS radio receiver 64. See operation 132. The server may collect similar data from the mobile terminal 10 over the course of time, as well as from other mobile terminals. While the mobile terminal 10 and the network entity, such as the server, may communicate in various manners, the mobile terminal 10 and the server may communicate in accordance with a secure protocol, such as a hypertext transfer protocol secure (HTTPS) protocol.

Figure 5:
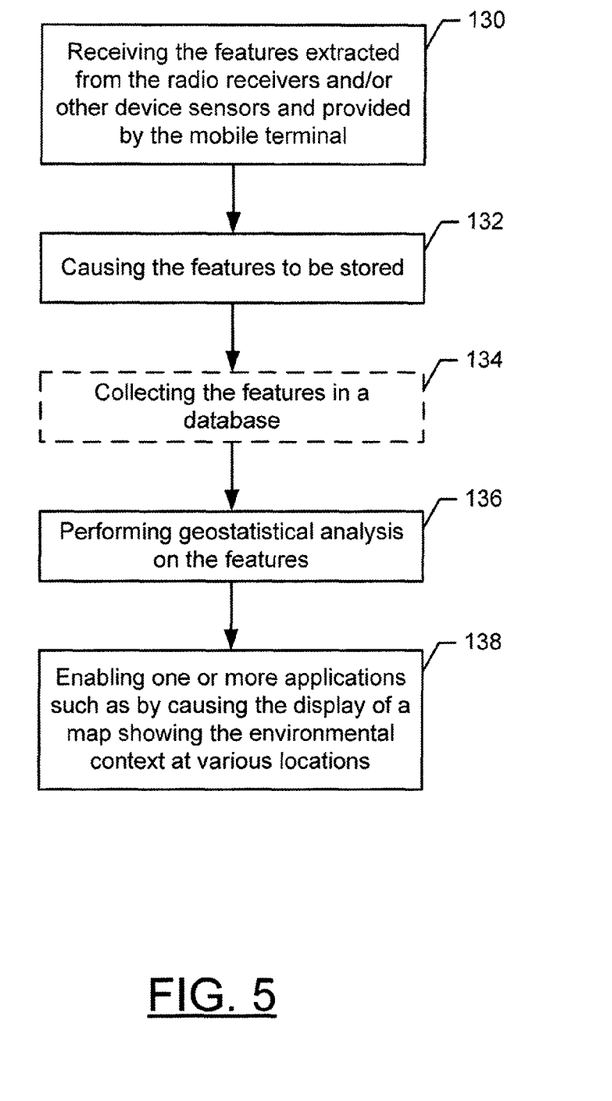
FIG. 5 is a flowchart illustrating the operations performed in accordance with another example embodiment of the present invention.

In order to enable additional geospatial analysis, the network entity, such as the server, may include means, such as the processor 102, the memory device 104, the communication interface 106 or the like, for collecting the information from the mobile terminals 10 to a database and means, such as the processor 102 or the like, for performing geostatistical analysis on the data including the features and the resulting environmental context, as shown in operations 134 and 136, respectively. See, for example, Hans Wackernagel, Multivariate Geostatistics, Third Edition, Springer-Verlag, for a further description of geostatistical analysis. The network entity, such as the server, may include means, such as the processor 102 or the like, for utilizing the further analyzed data to enable various applications, such as the generation of a webpage that displays the relevant information, such as the display of a map with the environmental context of various locations identified on the map, such as by being an office, a home, a vehicle, a natural setting, a restaurant or the like. As noted above, the mobile terminal 10 may cause the location of the mobile terminal 10 to be provided along with the feature vector and the resulting environmental context. In one embodiment, the location of the mobile terminal 10 may provided in accordance with GPS-location-tag context data. The mobile terminal 10 and/or the server may round the location data to gridpoint corners. The data belonging to the same grid is then, for example, averaged to obtain the statistics that are valid for the entire area covered by the grid. Regardless of its constructions, a user of a mobile terminal 10 may access the map to obtain additional environmental context information on a more macro scale.

As described above, FIGS. 3 and 5 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a mobile terminal 10 or a network entity, such as a server, and executed by a processor 20 in the mobile terminal 10 or the network entity, e.g., server. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts' blocks. These computer program instructions may also be stored in a non-transitory computer-readable memory that may direct a computer or other programmable apparatus to function in a particular manner, such that the instructions stored in the computer-readable memory produce an article of manufacture which implements the functions specified in the flowcharts' blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts' blocks.

Accordingly, blocks of the flowcharts of FIGS. 3 and 5 support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Additionally, some blocks of the flowcharts of FIGS. 3 and 5 are shown in dashed lines. In this regard, the dashed lines are indicative of optional operations that may be included in some embodiments, but need not be included in all embodiments. As such, it should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving a first feature from a first radio receiver;
receiving a second feature from a second radio receiver,
wherein the second radio receiver is of a different type than the first radio receiver,
wherein at least one of the first feature or the second feature is a result of a statistical application over a predetermined period of time of a signal received from the first radio receiver or the second radio receiver;

determining, with a processor, an environmental context based upon a combination of the first and second features; and causing one or more applications to perform in accordance with the environmental context.

2. The method according to claim 1 further comprising concatenating the first feature and the second feature into a feature vector, and wherein determining the environmental context comprises determining the environmental context based upon the feature vector.

3. The method according to claim 2 further comprising normalizing the feature vector.

4. The method according to claim 2 further comprising transforming the feature vector.

5. The method according to claim 4 wherein transforming the feature vector comprising transforming the feature vector in accordance with a linear transform.

6. The method according to claim 2 wherein determining the environmental context further comprises applying a classifier to the feature vector.

7. An apparatus comprising at least one processor and at least one memory storing computer program code, wherein the at least one memory and stored computer program code are configured, with the at least one processor, to cause the apparatus to at least:

receive a first feature from a first radio receiver;

receive a second feature from a second radio receiver, wherein the second radio receiver is of a different type than the first radio receiver, wherein at least one of the first feature or the second feature is a result of a statistical application over a predetermined period of time of a signal received from the first radio receiver or the second radio receiver;

determine an environmental context based upon a combination of the first and second features; and cause one or more applications to perform in accordance with the environmental context.

8. The apparatus according to claim 7 wherein the at least one memory and stored computer program code are further configured, with the at least one processor, to cause the apparatus to concatenate the first feature and the second feature into a feature vector, and wherein the at least one memory and stored computer program code are configured, with the at least one processor, to cause the apparatus to determine the environmental context by determining the environmental context based upon the feature vector.

9. The apparatus according to claim 8 wherein the at least one memory and stored computer program code are further configured, with the at least one processor, to cause the apparatus to normalize the feature vector.

10. The apparatus according to claim 8 wherein the at least one memory and stored computer program code are further configured, with the at least one processor, to cause the apparatus to transform the feature vector.

11. The apparatus according to claim 10 wherein the at least one memory and stored computer program code are configured, with the at least one processor, to cause the apparatus to transform the feature vector by transforming the feature vector in accordance with a linear transform.

12. The apparatus according to claim 8 wherein the at least one memory and stored computer program code are configured, with the at least one processor, to cause the apparatus to determine the environmental context by applying a classifier to the feature vector.

13. The apparatus of claim 7, wherein the apparatus comprises or is embodied in a mobile terminal.

14. The apparatus of claim 13, wherein the mobile terminal comprises user interface circuitry and user interface software stored on one or more of the at least one memory;

wherein the user interface circuitry and user interface software are configured to:

facilitate user control of at least some functions of the mobile terminal through use of a display; and cause at least a portion of a user interface of the mobile terminal to be displayed on the display to facilitate user control of at least some functions of the mobile terminal.

15. A non-transitory computer-readable storage medium having computer-readable program instructions stored therein, the computer-readable program instructions comprising:

program instructions configured to receive a first feature from a first radio receiver;

program instructions configured to receive a second feature from a second radio receiver, wherein the second radio receiver is of a different type than the first radio receiver, wherein at least one of the first feature or the second feature is a result of a statistical application over a predetermined period of time of a signal received from the first radio receiver or the second radio receiver;

program instructions configured to determine an environmental context based upon a combination of the first and second features; and program instructions for causing one or more applications to perform in accordance with the environmental context.

16. The non-transitory computer-readable storage medium according to claim 15 wherein the computer-readable program instructions further comprise program instructions configured to concatenate the first feature and the second feature into a feature vector, and wherein the program instructions configured to determine the environmental context comprise program instructions configured to determine the environmental context based upon the feature vector.

17. The non-transitory computer-readable storage medium according to claim 16 wherein the computer-readable program instructions further comprise program instructions configured to normalize the feature vector.

18. The non-transitory computer-readable storage medium according to claim 16 wherein the computer-readable program instructions further comprise program instructions configured to transform the feature vector.

19. The non-transitory computer-readable storage medium according to claim 18 wherein the program instructions configured to transform the feature vector comprise program instructions configured to transform the feature vector in accordance with a linear transform.

20. The non-transitory computer-readable storage medium according to claim 16 wherein the program instructions configured to determine the environmental context further comprise program instructions configured to apply a classifier to the feature vector.

21. A method comprising:

receiving first and second features that have been extracted by a mobile terminal from first and second radio receivers, respectively;

causing the first and second features to be stored, wherein at least one of the first feature or the second feature is a result of a statistical application over a predetermined period of time of a signal received from the first radio receiver or the second radio receiver;

determining an environmental context based upon a combination of the first and second feature;
performing, with a processor, a geostatistical analysis of the first and second features;
enabling at least one application to utilize a result of the geostatistical analysis of the first and second features that have been extracted by the mobile terminal from the first and second radio receivers, respectively; and
causing the at least one application to perform in accordance with the geostatistical analysis.

22. The method according to claim 21 wherein performing the geostatistical analysis comprises performing the geostatistical analysis of the first and second features and the environmental context.

23. A method according to claim 22 wherein enabling at least one application comprises causing a display of a map depicting the environmental context at a plurality of locations.

* * * * *

UNITED STATES PATENT AND TRADEMARK OFFICE
CERTIFICATE OF CORRECTION

PATENT NO. : 8,838,147 B2  
APPLICATION NO. : 13/222708  
DATED : September 16, 2014  
INVENTOR(S) : Eronen et al.

Page 1 of 1

It is certified that error appears in the above-identified patent and that said Letters Patent is hereby corrected as shown below:

In the claims:

Column 19,
Line 2, "second feature;" should read --second features--;
Line 15, "A method according" should read --The method according--.

Signed and Sealed this
Thirtieth Day of June, 2015

Michelle K. Lee
*Director of the United States Patent and Trademark Office*